(12) United States Patent
Baleriaux et al.

(10) Patent No.: US 10,413,480 B2
(45) Date of Patent: Sep. 17, 2019

(54) CONNECTING MEMBER

(71) Applicant: ASEPTIC TECHNOLOGIES S.A., Gembloux (BE)

(72) Inventors: Patrick Baleriaux, Ham-sur-Heure-Nalinnes (BE); Julien Maréchal, Etterbeek (BE)

(73) Assignee: ASEPTIC TECHNOLOGIES S.A., Gembloux (BE)

( * ) Notice: Subject to any disclaimer, the term of this patent is extended or adjusted under 35 U.S.C. 154(b) by 653 days.

(21) Appl. No.: 15/051,294

(22) Filed: Feb. 23, 2016

(65) Prior Publication Data

US 2016/0242999 A1 Aug. 25, 2016

(30) Foreign Application Priority Data

Feb. 23, 2015 (BE) .................................. 2015/5096

(51) Int. Cl.
| | |
|---|---|
| *A61J 1/14* | (2006.01) |
| *B01L 1/02* | (2006.01) |
| *A61J 1/20* | (2006.01) |
| *F16L 55/00* | (2006.01) |

(52) U.S. Cl.
CPC .......... *A61J 1/1443* (2013.01); *A61J 1/1475* (2013.01); *A61J 1/2048* (2015.05); *B01L 1/025* (2013.01); *F16L 55/00* (2013.01); *F16L 2201/44* (2013.01)

(58) Field of Classification Search
CPC ............... F16L 5/14; F16L 5/02; A61J 1/1475
USPC ......................... 285/143.1, 141.1, 139.1, 904
See application file for complete search history.

(56) References Cited

U.S. PATENT DOCUMENTS

| 3,195,564 | A | * | 7/1965 | Carney | ................... F16K 49/00 285/904 |
|---|---|---|---|---|---|
| 3,488,067 | A | | 1/1970 | Sommer | |
| 3,988,029 | A | * | 10/1976 | Gibson | ................ F16L 39/005 285/904 |
| 4,011,732 | A | * | 3/1977 | Doherty | ............... F16L 39/005 285/904 |

(Continued)

FOREIGN PATENT DOCUMENTS

| EP | 0742562 B1 | 10/2005 |
|---|---|---|
| EP | 1312096 B1 | 10/2005 |

(Continued)

*Primary Examiner* — David Bochna
(74) *Attorney, Agent, or Firm* — Christensen O'Connor Johnson Kindness PLLC (57) ABSTRACT

A connecting member is provided between an inside environment of a compartment and an environment outside the compartment. The compartment is isolated relative to the outside environment and the compartment comprising a communication orifice defined by a first connector connecting element. The connecting member comprises a main body arranged to cooperate with the communication orifice of the isolated compartment. The main body comprises a second connector or connecting element complementary to the first connecting element of the communication orifice so as to form a tight connection between the first connecting element and the second connecting element, the main body further being crossed through by a tubing comprising a first end on the side of the outside environment and a second end on the side of the inside environment.

19 Claims, 4 Drawing Sheets

(56) References Cited

U.S. PATENT DOCUMENTS

| | | | | |
|---|---|---|---|---|
| 4,491,347 A | * | 1/1985 | Gustafson | F16L 59/141 |
| | | | | 285/904 |
| 5,290,071 A | * | 3/1994 | Rider | F16L 5/06 |
| | | | | 285/139.1 |
| 5,725,331 A | | 3/1998 | Martinez | |
| 6,158,783 A | * | 12/2000 | Johnson | F16L 41/02 |
| | | | | 285/139.1 |
| 6,582,415 B1 | * | 6/2003 | Fowles | A61J 1/1406 |
| | | | | 137/614.04 |
| 7,052,047 B1 | * | 5/2006 | Box | F16L 37/248 |
| | | | | 285/904 |
| 7,192,065 B2 | | 3/2007 | Thilly et al. | |
| 7,431,352 B2 | | 10/2008 | Thilly et al. | |
| 9,675,520 B2 | | 6/2017 | Rogers et al. | |
| 2002/0123736 A1 | * | 9/2002 | Fowles | A61J 1/1406 |
| | | | | 604/413 |

FOREIGN PATENT DOCUMENTS

| | | | |
|---|---|---|---|
| FR | 1499227 A | 10/1967 | |
| GB | 1175873 A | 1/1970 | |

\* cited by examiner

CONNECTING MEMBER

BACKGROUND

In the pharmaceutical industry, there are different types of environments classified as grade A, B, C, D, etc., grade A traditionally corresponding to the cleanest environmental classification grade. The cleaner the grade is, the stricter the standards are that govern tolerance with respect to the presence of contaminants, such as microorganisms, residues of biological/biotechnological materials (proteins, etc.), fine particles and dust. Traditionally, clean rooms in a GMP (Good Manufacturing Process) environment are aseptic rooms that have zones A, B, C and D through which the different substances designed to become pharmaceutical products pass.

In this context, grade A corresponds to the final environment in which the injectable pharmaceutical products are distributed into final containers, typically tubes, blisters or vials after passing through filling needles. These tubes, blisters or vials are of course sterilized beforehand and treated so as to minimize their particulate content. They are also inert with respect to the pharmaceutical product that they contain inasmuch as they release very few or no particles or chemical compounds into the solution. In general, these containers must meet very strict standards to guarantee patient safety.

Consequently, during the production method, the medium containing the substance intended to become a pharmaceutical product undergoes different steps such as purifications, filtrations or other transformations, which means that the substance goes from a zone with a particular grade toward a zone with a higher grade or from one container to another, etc. These containers or zones have an outside environment and an inside environment, the outside environment essentially being less clean or less likely to be clean than the inside environment. Thus, a pouch containing a substance intended to be distributed in grade A cannot itself be in grade A if it has previously been exposed to an environment with a lower grade, since the outside of the pouch may be contaminated and therefore contaminate the inside environment of the grade A zone, and consequently, the pharmaceutical product itself.

Conversely, some pharmaceutical products that are particularly active, such as antineoplastic products, for example, or certain products resulting from biotechnology using the live viral vectors, require confining the distribution operations in a closed enclosure in order to minimize the risk of contamination of the surrounding space, i.e., the medium outside the compartment.

Today, various solutions for transfers between zones of different grades or different contamination levels have been developed, which all aim to reduce the risk of contamination of a zone by the environment of another zone. As an example, for the aseptic filling of tubes/vials/blisters with pharmaceutical products, there are grade A "glove boxes" that contain the tubes/vials/blisters as well as filling needles and that comprise a communication orifice through which the content of a reservoir situated in an outside environment (potentially of a less clean grade) is transferred. These communication orifices are equipped with devices making it possible to minimize the risk of contamination by using connecting members that cooperate tightly with the communication orifice, without risking placing the pharmaceutical product to be transferred in contact with surfaces that could have been contaminated by exposure to an environment with a lower grade.

A connecting member as mentioned in the beginning of this document is known from document EP 1,312,096. More particularly, this connecting member is described as ensuring the aseptic transfer of a fluid starting from a container situated in an environment with a given grade toward smaller containers present in an environment with a higher grade, the content of the containers having to be completely sterile.

Such transfers are critical in particular in the pharmaceutical industries, where it is imperative for the packaging of large volumes of stock solutions in smaller volumes to be done without risking contaminating the solution to be distributed. To that end, the smaller containers are filled in a compartment aseptically isolated from the outside environment, the fluid being pumped for example from a pouch, passing through the tubing of the connecting member, then being distributed in the smaller containers, which are filled using an aseptic filling device.

During these operations, the connecting member, connected at one of its ends to the container of the stock solution and at its other end (situated inside the sterile compartment) to an aseptic fluid filling device, plays a key role inasmuch as it constitutes the interface allowing the aseptic transfer of the fluid between the outside surrounding medium (typically less clean, but not necessarily) and the inside environment of the compartment. To ensure complete isolation between the inside environment of the compartment and the outside environment of the compartment, connecting means respectively present at the communication orifice of the compartment and at the connecting member are provided so as to form a tight connection preventing any entry of contaminants in the compartment. This tight connection is ensured by a placement in contact, via the aforementioned connecting members, of the rigid wall of the compartment with the connecting member, which is also rigid, a flexible sealing gasket being able to be present between these two rigid members in order to reinforce the tight nature of the connection.

Furthermore, in prior art document EP 1,312,096, a cartridge surrounds and removably cooperates with the part of the connecting member that enters the compartment. More particularly, the cartridge protects the connecting part that enters the compartment, and which itself is clean and sterile. A removable closing device inside the compartment is also provided that cooperates with said cartridge. The cartridge and the removable closing device are arranged relative to one another such that no contaminant can compromise the stability of the compartment where the filling of the small containers takes place. In fact, the removable closing device confines of the contaminants that may be present on the cartridge between its inner wall and the outer wall of the cartridge. When the movable closing device is removed, it is provided to drive the simultaneous withdrawal of the cartridge without any contaminant being able to reach the inside environment of the compartment inasmuch as the contaminants are confined between the outer wall of the cartridge and the inner wall of the removable closing device.

Unfortunately, even if the fluid transfers between environments with different classifications are indeed done in a sterile manner with such a device known from the state of the art, the fact nevertheless remains that the fluid must necessarily pass through the tubing of the connecting member. Yet the connecting member, and therefore the tubing of the latter, traditionally being manufactured from a plastic material (for example, polybutylene terephthalate, or PBT), contamination of the fluid crossing through it may be observed following the contact of the fluid with said plastic material. This contamination of the passing fluid can, for example, take the form of a release of particles or chemical compounds from this plastic material, or on the contrary, the form of an adsorption, on the walls of the tubing, of the chemical or biological components knowingly contained in the fluid. As minimal as they may be, these contaminations by the material of the tubing cannot be tolerated regarding sensible injectable pharmaceutical products such as certain vaccines, for example. Consequently, the use of such connecting members requires validating the absence of risk of contamination by interaction between the material of the connecting member and the transferred product, such validations generally being lengthy, restrictive and costly. To date, such connecting members are therefore limited to certain fluids and applications. Furthermore, another drawback lies in the fact that the current connecting members have a tubing whereof the diameter is invariable and subject to manufacturing methods in particular based on the use of molds. Yet, for example, depending on the viscosity of the fluid to be transferred or the low quantity of product available, this fixed diameter of the connecting member is not optimal in all scenarios.

FR1499227 proposes to use a funnel set for a tube-tube connection. This solution presents different drawbacks. There is an empty space between the two tubes when they are put in communication. This is a source of contamination: in particular, small-size contaminants, from air for instance, can fill this empty space. Furthermore, the flexible element for joining the two tubes is a point of weakness. Connection between the two tubes is thus not very secured, and one could have liquid passing from one tube to another that comes into contact with possible contaminated elements such as internal walls of the main passage or communication orifice of the wall separating the clean environment from the dirty one.

SUMMARY OF THE DISCLOSURE

Embodiments of the present disclosure aim to offset the drawbacks of the state of the art by, for example, procuring a connecting member manufactured traditionally starting from a plastic material, but making it possible to eliminate any contamination of the fluid in contact with this plastic material. The aim of various embodiments of the present disclosure is therefore to procure a connecting member that is versatile, e.g., that is able to ensure the transfer of any fluid through a wall separating environments, for example, with different classifications, and which, to do so, does not require particular validation in light of the risk of interaction between the component material of the connecting member and the transferred product, even for fluids for which no trace of contamination can be tolerated. Furthermore, various embodiments of the present disclosure aim to procure a connecting member whose use is not strictly limited by the diameter of its tubing.

In order to resolve this problem or others, it is provided, according to an aspect of the present disclosure, to have a connecting member disposed between an inside environment of a compartment and an environment outside the compartment. The compartment is isolated relative to said outside environment and said compartment comprising a communication orifice defined by a first connecting means, said connecting member comprising a main body arranged to cooperate with said communication orifice of said isolated compartment, said main body comprising a second connecting means complementary to said first connecting means of said communication orifice so as to form a tight connection between said first connecting means and said second connecting means, said main body further being crossed through by a tubing comprising a first end on the side of said outside environment and a second end on the side of said inside environment.

In other embodiments of the present disclosure, the connecting member is characterized by one or more of the following, in any combination:
  second end of said tubing is located beyond (or past) said main body in the inside environment (I);
  said tubing receives a supply line whereof a first end situated inside said tubing and located beyond said main body in said inside environment is connected to a coupling member provided with an inner channel,
  said coupling member comprises a first end arranged to provide a tight connection with said first end of said supply tubing,
  said coupling member is arranged to be tightly connected to said tubing,
  said coupling member has a second end forming a male or female tip for a connection,
  said supply line has a line part extending past said first end of said tubing and being arranged to be connected to a container of the fluid and/or a pump and/or a metering system and/or a filtration system.

Therefore, the connecting member in accordance with one or more embodiments comprises the tubing, the supply line, and the coupling member. The disclosed subject matter proposes different possible embodiments, and the features of the different claims can be combined, resulting in several other representative embodiments.

Such a connecting member according to one or more embodiments of the present disclosure makes it possible to eliminate any issue related to the contamination of the fluid from the plastic material forming the connecting member. Indeed, since a supply line crosses through the tubing, the fluid no longer passes through the latter, but in the supply line, which can be chosen to be adapted on a case-by-case basis, depending on each considered transfer. According to one or more embodiments of the present disclosure, both the material and the diameter of the supply line can be adapted to each application. This makes it possible to ensure the versatility of the connecting member, optimize fluid transfers, and ensure in most cases, and all in some cases, non-contamination of the fluid due to the plastic material making up the connecting member.

The connecting member according to representative embodiments of the present disclosure ensures an aseptic transfer. Indeed, the supply line, the outside of which may be contaminated since it has been in contact with the outside surrounding medium of the compartment, is tightly connected to a coupling member with an aseptic grade corresponding to that of the environment inside the compartment. This coupling member is itself tightly connected to said tubing at the end of the connecting member located in the inside environment of the compartment, which also has an aseptic grade for the environment inside the compartment. Consequently, any contaminants that may be present on the outside of the supply line are confined between the outer wall of the supply line and the inner wall of the tubing of the connecting member without being able to be introduced into the compartment, since tight couplings are provided not only between the coupling member and the supply line, but also between the coupling member and the tubing, and without being able to come into contact with the transferred product. Any contaminant is therefore confined in the tubing and therefore cannot reach the environment inside the compartment, since tight connections form a "barrier" aseptically isolating the inside of the compartment.

In some embodiments, the second end of the tubing is located beyond (or past) the main body on the side of the inside environment (I). In other words, tubing extends farther than the main body in the inside environment (I), from a connecting wall separating this environment (I) from an outside environment (E). This allows having a later filling step that is easy, and safe. In particular, it is possible to carry out the filling step quite far from the wall separating inside (I) from outside (E) environments, without needing a large main body. As tubing extends beyond the main body in the inside environment (I), it is possible to place around it a cartridge that forms an enclosure that isolates any part of the connecting member designed to be exposed to the inside of the environment (I). This advantage that is detailed below is not possible with the system of FR1499227. As it is further detailed below, when tubing of the connecting member is introduced in the communication orifice of the connecting wall separating inside (I) and outside (E) environments, the cartridge around tubing typically penetrates into a removable inner closing device that can be manipulated easily as tubing extends beyond the main body in inside environment (I). This allows having a connecting member that is safe. Furthermore, it is possible to make a relatively long tubing, such that its second end is quite far from the main body, and the boundary (or connecting wall) between outside (E) and inside (I) environments. This further limits the risks of any contamination, as the manipulation of a cartridge and the connection of second end of the coupling member to other lines is carried out far from the outside environment (E) and the main body.

In some embodiments, the tubing extends between 5 cm to 20 cm past the main body in the inside environment (I), and more preferably 10 cm. In some embodiments, the first end of the tubing is located beyond (or past) the main body on the side of the outside environment (E).

In some embodiments, the supply line located in the tubing has a first end that is connected to a coupling member, for a further connection with another supply line in the inside environment. In some embodiments, the coupling member has a second end situated outside the tubing, said second end forming a male or female tip for a connection. The first end of the supply line is situated inside the tubing but beyond (or past) the main body on the side of the inside environment. With connecting members disclosure herein, the supply line is continuous, typically of one piece (one single tube for instance), and passes from outside (E) to inside (I) environments continuously. This is not the case in FR1499227: a tube (that is in fact a container as this document describes a tube-tube connector) is coupled to a funnel set, and the whole assembly (tube+funnel set) is introduced in the orifice of the barrier separating outside (E) and inside (I) environments. As the connecting member of representative embodiments of the present disclosure uses only one tube of one piece passing from outside to inside environments, it is safer. A mechanical coupling between two tubes is typically a source of weakness. Moreover, as the first end of the supply line is positioned beyond the main body in the inside environment, one can use a relatively small coupling member for joining the supply line with another one, in the inside environment, while keeping the possibility to make the communication far from the boundary between internal (I) and external (E) environments.

In some embodiments, the coupling member is totally situated in the inside environment side. This means on a side with respect to a connecting wall separating inside (I) and outside (E) environments such that it lies completely in the inside (I) environment side.

In some embodiments, the second end of the coupling member is preferably situated outside the tubing. This allows a connection with another line that is easy, as it is not needed to do it inside the tubing.

In some embodiments, the supply line is made from a material that is inert with respect to the product to be transferred, for example, silicon or Teflon® (PTFE), traditionally used in pharmaceutical production.

Furthermore, the supply line in some embodiments is made from a flexible material.

In some embodiments, the inner channel of the coupling member has a diameter smaller than or equal to the internal diameter of first extremity of supply line. This allows having a safer connection. In particular, the risk of having empty space or space where contaminants stay is reduced. In particular and preferably, it is possible to introduce first extremity of the coupling member into first extremity of the supply line.

In some embodiments, the external diameter of the supply line is smaller than the internal diameter of the tubing. Advantageously, said coupling member in some embodiments is provided with a sealing gasket arranged to provide a tight coupling between said first end of said supply line and said tubing. This tight coupling is realized beyond (or past) the main body on the side of the inside environment. Depending on the coupling member used, it may be useful for such a sealing gasket to be present in order for the coupling member to be inserted completely tightly in said tubing. Indeed, perfect sealing should be ensured between these two members of the connecting system so that no contaminant can enter the sterile compartment where the filling of smaller containers takes place. Optionally, said second coupling member has an outer wall provided with/formed by sealing members.

In some embodiments, the coupling member of said connecting member comprises, in sequence, a male tip, a collar and an end part inserted into said supply line, said collar abutting on said second end of said tubing. This arrangement, due to the presence of a collar that may or may not be associated with the presence of a sealing gasket as described above, ensures appropriate tightness preventing any entry of contaminants in the sterile compartment. Indeed, the collar is provided to bear tightly against the end of the tubing, which contributes to sealing the coupling between the tubing and the coupling member.

In some embodiments, at least part of said second end of said tubing of the connecting member has an inner or outer thread arranged to allow fastening and tight connection between said coupling member and said second end of said tubing. Still with the aim of ensuring optimal tightness between the coupling member and the tubing of the connecting member, each of these members can be provided with a complementary screw pitch allowing tightening of the coupling member on or in the tubing. Optionally, an intermediate tightening member such as a nut may be used to that end to make the coupling member abut against the second end of the tubing before cooperating with a screw pitch present on the outer surface of the tubing and thus ensuring tightening. Being able to screw the coupling member at the end of the tubing has a dual advantage, i.e., keeping the coupling member in place at the tubing and forming an optimal tight connection obtained owing to the tightening (screwing), this reinforcing the "barrier" blocking any entry of contaminants in the inside environment of the compartment.

According to one embodiment of the present disclosure, said coupling member and said second end of said tubing are tightly connected by means of a snap-fit-type connection allowing snapping of the coupling member at the second end of the tubing.

In some embodiments, the male or female tip of said second end of said coupling member of the connecting member is arranged to cooperate with a corresponding male or female tip of a coupling part so as to form a quick tight connection arranged to establish a coupling, by means of a supply line, between said coupling member and an aseptic filling device for a fluid. Such a quick connection, made possible owing to the configuration of the coupling member provided with a tip arranged to cooperate with a complementary tip of a coupling part, makes it possible to connect the connecting member quickly to an aseptic filling device for a fluid in the compartment.

In some embodiments, said male or female tip of said second end of said coupling member of the connecting member is closed by a removable closing means, for example, a removable stopper.

In some embodiments, said connecting member is a single-use connecting member. The single-use connecting member is typically, but not exclusively, provided to be thrown away and is generally sterilized before use. Furthermore, in general, such a single-use connecting member is made from a plastic material such as PBT or PVC, these materials being inexpensive and suitable for manufacturing rigid connecting members according to the traditional methods, such as molding or extrusion manufacturing methods.

In some embodiments, the inner diameter of said tubing of said connecting member is comprised between 3 and 250 mm, and in other embodiments comprised between 7 mm and 50 mm.

In some embodiments, said second connecting means for connecting said main body of said connecting member has a tight surface that is coupled with a corresponding tight surface of said first connecting means defining said communication orifice of said compartment. The coupling of these tight surfaces makes it possible to isolate the inside environment of the compartment from the outside, non-sterile environment. These tight surfaces can for example be formed by compressible sealing gaskets which, during the placement of the connecting member at the communication orifice of the compartment (i.e., between the inside environment and the outside environment of the compartment), provides sterile isolation of the inside environment of the latter from the outside environment.

In some embodiments, said connecting member further comprises a cartridge mounted removably on the main body of said connecting member and which, once mounted on said main body of said connecting member, is secured to said main body so as to form an enclosure that isolates said second end of said tubing, associated or not associated with a coupling member, from said outside environment. Such a cartridge is particularly advantageous since it isolates, from the surrounding medium with a low environmental classification, any part of the connecting member that is designed, for example, to be inserted and exposed in the high classification compartment. The cartridge keeps the contaminants on its outer surface and guarantees that no contaminant can reach the part of the main body and the part of the tubing of the connecting member (optionally associated with a coupling member) that will be exposed in the high environmental classification compartment.

In some embodiments, said cartridge of said connecting member comprises an open end and a closed end, said open end comprising fixing means arranged to cooperate with corresponding fixing means of said main body of said connecting member so as to tightly and removably mount said cartridge on said main body. For example, these fixing means can assume the form of complementary screw pitches.

In some embodiments, said cartridge of said connecting member has a tight surface that couples with a corresponding tight surface of said main body of said connecting member. Here, coupling of these tight surfaces makes it possible to isolate the sterile (or high classification) inside environment of the cartridge from the nonsterile (or lower classification) outside environment, and consequently to sterilely (or aseptically) isolate any part of the connecting member that is intended to be inserted and exposed in the sterile (or high classification) compartment. These tight surfaces can for example be formed by compressible sealing gaskets.

Other embodiments of the connecting member are described in the appended claims.

An aspect of the present disclosure also relates to an assembly or a kit comprising:
—any embodiment of the connecting member disclosed herein, and
—a container for a fluid and/or a pump and/or a metering system and/or a filtration system arranged to be connected to a line part of a feed line of said connecting member.

An aspect of the present disclosure also relates to another assembly or another kit comprising:
—a coupling part comprising a male or female tip arranged to cooperate with a male or female tip of a coupling member of a connecting member, so as to form a tight quick connection, and
—a supply line arranged to connect, by means of said coupling part, said coupling member and a device for the aseptic distribution of a fluid and/or a filtration system and/or a metering system.

Embodiments of assemblies or kits are described in the appended claims.

An aspect of the present disclosure also relates to a connecting system for connecting an inside environment of a compartment and an environment outside said compartment, said connecting system comprising:
—a connecting wall having a communication orifice, and
—a connecting member.

In some embodiments, said connecting wall can be an integral part of a so-called "glovebox"-type compartment or said connecting wall can be a wall arranged to be mounted on an existing wall of a compartment, this existing wall having previously been pierced with an opening.

In some embodiments, the connecting system further comprises:
a cartridge mounted removably on the main body of said connecting member and which, once mounted on said main body of said connecting member, is secured to said main body so as to form an enclosure that isolates said second end of the tubing, associated or not associated with a coupling member, from said outside environment, and
a removable closing device inside said compartment arranged to seal said communication orifice of said compartment, arranged to be able to be removed from the inside of said compartment and arranged to be able to be coupled separately with said cartridge when said main body of said connecting member cooperates with said communication orifice of said compartment so as to form a tight connection between said first connecting means and said second connecting means, said removable closing device further being arranged such that, when it is removed from the inside of said compartment, it allows a simultaneous removal of said cartridge by separating it from said main body of said connecting member.

The potentially contaminated outer surfaces of the cartridge are therefore introduced and captured in the removable closing device inside the compartment, said removable closing device being arranged to allow a removal of the cartridge with exposure only of the sterile (or aseptic) outer surfaces of the cartridge and the sterile (or aseptic) part of the connecting member called upon to be inside the compartment with a high environmental classification.

An aspect of the present disclosure also relates to a connecting system for connecting an inside environment of a compartment and an environment outside said compartment, arranged to cooperate with a connecting member as described before, said connecting system comprising:

a connecting wall having a communication orifice, and a removable closing device inside said compartment arranged to seal said communication orifice of said compartment, arranged to be able to be removed from inside said compartment and arranged to be able to be coupled separately with the cartridge of the preferred connecting member when the main body of said connecting member cooperates with said communication orifice of said compartment so as to form a tight connection between said first connecting means and said second connecting means, said removable closing device further being arranged such that, when it is removed from the inside of said compartment, it allows a simultaneous removal of said cartridge by separating it from said main body of said connecting member.

In some embodiments, said removable closing device inside said compartment has a tight surface that is coupled with a corresponding tight surface of said first connecting means defining said communication orifice of said compartment and with a corresponding tight surface of said cartridge.

In some embodiments, said removable closing device inside said compartment comprises fixing means arranged to cooperate with corresponding fixing means of said cartridge so as to mount said removable closing device on said cartridge, tightly and removably.

In some embodiments, said cartridge has tight surfaces that coupled with corresponding tight surfaces of said removable closing device.

Other embodiments of a connecting system are described in the appended claims.

An aspect of the present disclosure also relates to a use of a connecting member disclosure herein to transfer a fluid.

Other embodiments of a connecting member are described in the appended claims.

An aspect of the present disclosure also relates to a use of an assembly or a kit disclosed herein to transfer a fluid.

Other embodiments of an assembly or a kit are described in the appended claims.

An aspect of the present disclosure also relates to a use of a connecting system disclosed herein to transfer a fluid.

Other embodiments of a connecting system are described in the appended claims.

Non-limitingly, a connecting member, an assembly or a kit, or a connecting system can be used to transfer a fluid under aseptic conditions, to transfer fluid from a contaminated medium toward a less contaminated medium without risk of contaminating the less contaminated medium with a contamination from the more contaminated medium or for transferring a fluid from a less contaminated medium to a more contaminated medium without risking contaminating the less contaminated medium with contamination coming from the more contaminated medium.

Furthermore, it is understood that the following two aspects are considered: on the one hand, in a first case, a connecting member or a connecting system is provided to protect (isolate) the inside environment of the compartment from an environment outside the compartment; on the other hand, in the second case, a connecting member or a connecting system is provided, conversely, to protect (isolate) the environment outside a compartment from inside environment of the compartment. The second case for example corresponds to the transfer of certain particularly active pharmaceutical products, such as antineoplastic products, or the transfer of certain products from biotechnology using live viral vectors, which requires confining the distribution operations in a closed enclosure in order to minimize the risk of contamination of the outside surrounding area, i.e., the outside medium of the compartment.

DESCRIPTION OF THE DRAWINGS

Other features, details and advantages of the claimed subject matter will appear from the following description, provided non-limitingly and in reference to the appended drawings.

In the figures, identical or similar members bear the same references.

DETAILED DESCRIPTION

Embodiments of the present disclosure relate to a connecting member between an inside environment of a compartment and an environment outside the compartment. The compartment is isolated relative to said outside environment and said compartment comprising a communication orifice defined by a first connecting means, said connecting member comprising a main body arranged to cooperate with said communication orifice of said isolated compartment, said main body comprising a second connecting means complementary to said first connecting means of said communication orifice so as to form a tight connection between said first connecting means and said second connecting means, said main body further being crossed through by a tubing comprising a first end on the side of said outside environment and a second end on the side of said inside environment.

The terms "compartment being isolated" or "isolated compartment" refer, within the meaning of the present disclosure, to the fact that the compartment is isolated within the meaning of sterility assurance, i.e., it is tightly isolated to prevent any contamination related to the presence of germs, bacteria, chemical particles, inert particles or any other contaminant. This isolation makes it possible to avoid contaminations between environments having different environmental conditions, more particularly between the inside environment of the compartment and the environment outside the compartment, the contaminants being able to be found either in the inside environment of the compartment, or in the environment outside the compartment.

Figure 1:
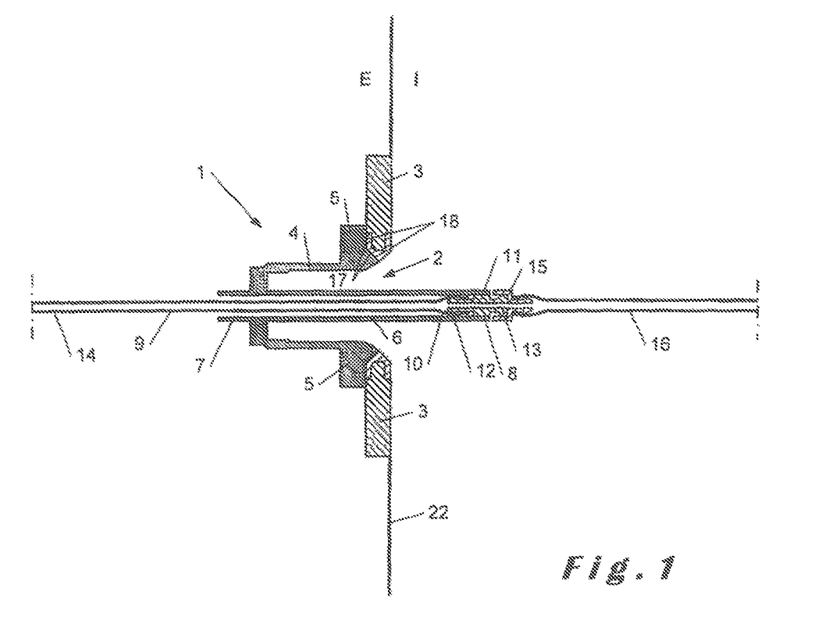
FIG. 1 is a diagrammatic illustration of a connecting member according to an embodiment of the present disclosure.

FIG. 1 illustrates a connecting member 1 that provides a sterile or aseptic connection between an inside environment I of a compartment and an environment E outside the compartment. The compartment comprises a connecting wall 22 comprising a communication orifice 2 that is defined by a first connecting means 3. The connecting member 1 has a main body 4 that comprises a second connecting member 5 provided to cooperate with the first connecting means 3 so as to form a tight connection at the communication orifice 2. In order to ensure a tight connection between the first connecting means 3 defining the communication orifice 2 of the connecting wall 22 and the second connecting member 5 of the main body 4 of the connecting member 1, tight surfaces 17, 18 are respectively present on these two members 3, 5 and are provided to be coupled, for example, by compression using a jaw system.

The main body 4 of the connecting member 1 is further crossed through by a tubing having a first end 7 on the side of the outside environment E of the compartment and a second end 8 on the side of the inside environment I of the compartment. The tubing 6 receives a supply line 9 whereof a first end 10 situated inside the tubing 6 is tightly connected to a first end 12 of a connecting member 11 provided with an inner channel. This connecting member 11 also has a second end 13 forming a male tip of a connection.

The coupling member 11 is further arranged so that a tight connection is established with the tubing 6. This tight connection can for example be provided by the coupling member itself which, during its insertion in the tubing 6, marries the inner walls of the latter tightly. This is in particular the case when the coupling member 11 is formed from a material that can deform slightly. The coupling member 11 can also, according to another embodiment, be associated with the presence of a sealing gasket (not shown), with which it cooperates in order to ensure a tight connection. According to still another embodiment, the coupling member 11 can be screwed at the tubing 6 by means of an outer or inner screw pitch provided at the end 8 of the tubing 6.

As illustrated in FIG. 1, the supply line 9 has a line part 14 that extends past said first end 7 of said tubing 6 and that is arranged to be connected to a container of a fluid and/or a pump and/or a metering or filtration system. Typically, the line part 14 is connected, directly or through a coupling system, to a pouch containing a stock solution that must be packaged sterilely in smaller containers, a pump (for example, a peristaltic pump) and/or a metering or filtration system making it possible to transfer the fluid toward the connecting member 1.

As indicated above, the coupling member 11 has a second end 13 forming a male tip of a connection. This male tip is provided to allow coupling with a coupling part 15 so as to form a tight quick connection arranged to establish a coupling, for example by means of a feed line 16, between the coupling member 11 and a device for the aseptic distribution of a fluid (not shown).

With such a connecting member 1, when a fluid to be packaged aseptically is transferred from a container (for example, from a pouch of a stock solution), it passes through a supply line 9 and not through the tubing 6 made from a plastic material that could potentially interact with the fluid and contaminate it. Inasmuch as any type of supply line 9 may be appropriate within the meaning of the claimed subject matter, any line with any diameter smaller than the inner diameter of the tubing 6 and initially formed from any material can be used. As an example, a supply line made from Teflon® or silicone could be appropriate, such materials being commonly used to transfer pharmaceutical products. Furthermore, inasmuch as all of the couplings between the different elements forming the connecting member 1 are done tightly, any contamination of the sterile internal environment of the compartment where the fluid packaging is done is avoided.

Figure 2:
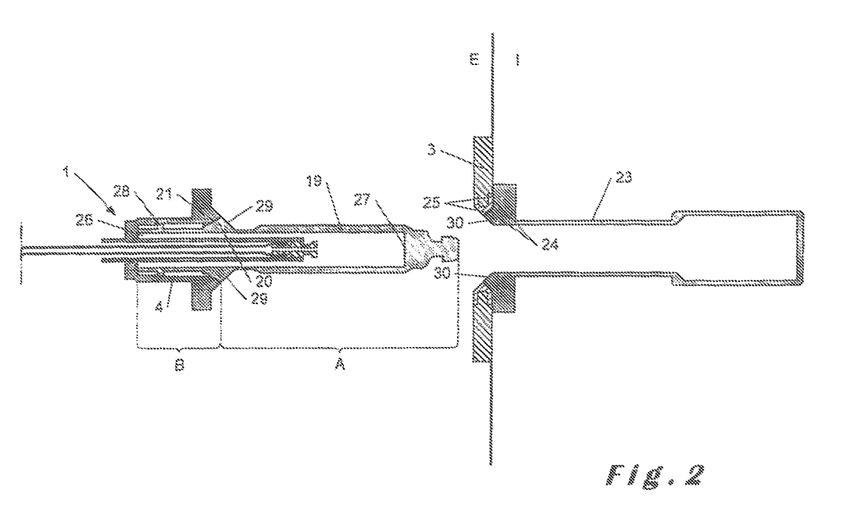
FIGS. 2 to 4 illustrate the sequential operation of a connecting system comprising a connecting member according to an embodiment of the present disclosure.
Figure 3:
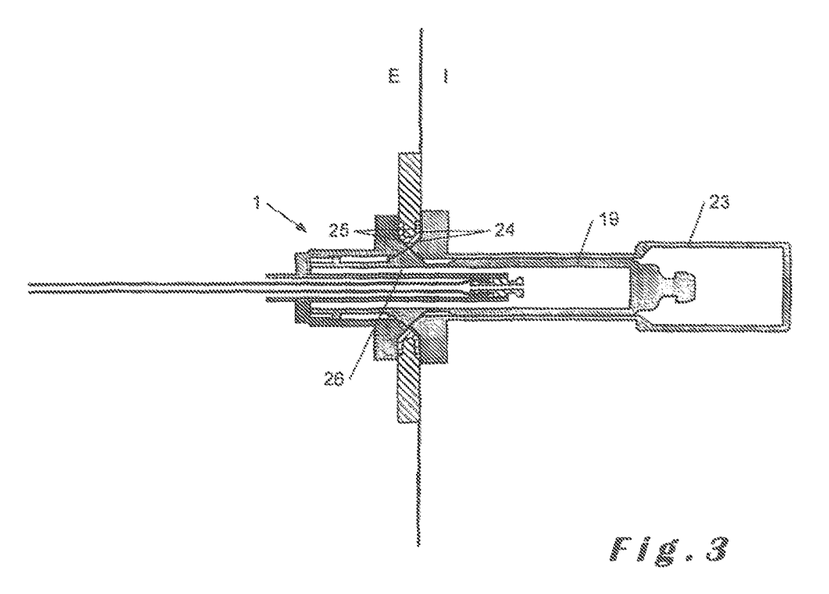
Figure 4:
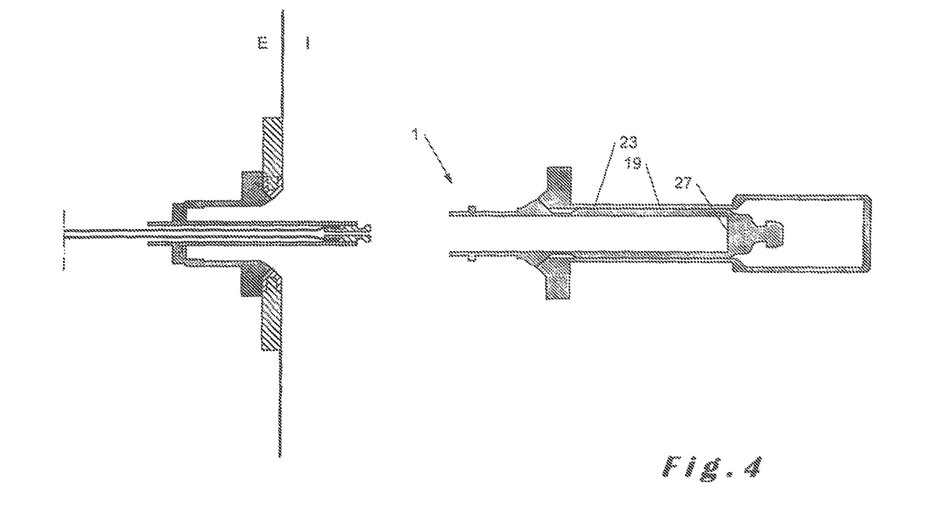

FIGS. 2 to 4 illustrate the sequential operation of a connecting system comprising a connecting member according to one or more embodiments of the present disclosure.

More particularly, FIG. 2 illustrates a connecting system where the connecting member 1, before its connection to the compartment, is associated with a cartridge 19 and where the compartment is provided with a removable inner closing device 23.

The cartridge 19 is arranged to be mounted removably on the main body 4 of said connecting member 1 and has an open end 26 and a closed end 27. The open end 26 comprises fixing means 28 arranged to cooperate with corresponding fixing means of said main body 4 of said connecting member 1 so as to tightly and removably mount said cartridge 19 on said main body 4. For example, the fixing means can have corresponding screw pitches or any other means making it possible to connect said cartridge 19 tightly and removably on said main body 4.

When the cartridge 19 is positioned correctly relative to the connecting member 1, it forms an enclosure that isolates any part of the connecting member 1 designed to be exposed to the inside of the environment I. More particularly, the cartridge 19 has a first cartridge part A and a second cartridge part B respectively exposed and not exposed to the surrounding medium E. Since the cartridge part B is contained inside the connecting member 1, it is protected from the surrounding medium E, while the cartridge part A is exposed to the surrounding medium E. In order to provide a partition between the connecting member 1 and the cartridge part B on the one hand, and the environment E on the other hand, the cartridge 19 is provided with tight surfaces 20 that couple with a corresponding tight surface 21 of the main body 4 of said connecting member 1.

As illustrated in FIG. 2, the inner removable closing device 23 is arranged to seal the communication orifice 2 of the compartment. To that end, said removable closing device 23 has a tight surface 24 that couples with a corresponding tight surface 25 of the first connecting means 3 defining the communication orifice 2 of the compartment.

FIG. 3 illustrates a connecting member 1 surrounded by its cartridge 19 and inserted in the compartment. As illustrated, following this insertion, the connecting member 1 surrounded by its cartridge 19 is located at least partially in the removable closing device 23 inside the compartment. In this position, the tight surfaces 24 of the removable closing device 23 couple on the one hand with the corresponding tight surfaces 25 of the first connecting means 3, and on the other hand with the corresponding tight surfaces 26 of the cartridge 19, which makes it possible to ensure the tightness and sterility if needed of the connecting system. Indeed, based on this positioning of the different elements, it is not possible for any contaminants to enter the compartment, the couplings of the various tight surfaces providing the partition between the environments.

The removable closing device 23 is further arranged to be able to be coupled separately with the cartridge 19 when the main body 4 of the connecting member 1 cooperates with the communication orifice 2 of said compartment. To that end, the removable closing device 23 comprises fixing means arranged to cooperate with corresponding fixing means of the cartridge 19 so as to tightly and removably mount the removable closing device 23 on said cartridge 19. Once the cartridge 19 containing the connecting member 1 is inserted in the removable closing device 23, the cartridge part B is captured in the removable closing device 23 and therefore does not contaminate (or is not contaminated by) the inner medium of the compartment.

As illustrated in FIG. 4, the removable closing device 23 is also arranged such that, when it is removed from inside the compartment, it allows the simultaneous removal of said cartridge 19 by separating it from said main body 4 of said connecting member 1. The cartridge 19 is provided with tight surfaces 29 that couple with corresponding tight surfaces 30 of said removable closing device. During this separation of the cartridge 19, the cartridge part B remains captured in the removable closing device 23, which prevents any contamination of the inner medium of the compartment by any contaminants found on the cartridge part B or, conversely, any contamination of the cartridge part B by the environmental conditions present in the compartment I. Only the cartridge part A and the part of the connecting member 1 that have never been in contact with the outside surrounding medium E are exposed to the inside of the compartment I.

Following the simultaneous removal of the cartridge 19 and the removable closing device 23, a connecting system as illustrated in FIG. 1 is obtained once the second end 13 of the coupling member 11 forming a male tip of a connection is coupled to a coupling part 15 so as to form a tight quick connection arranged to establish a coupling, for example, by means of a supply line 16, between the coupling member 11 and the device for aseptic filling of a fluid (not illustrated).

Of course, the present disclosure is in no way limited to the environments described above, and modifications may be made thereto without going beyond the scope of the appended claims.

The invention claimed is:

1. A connecting member between an inside environment of a compartment and an environment outside said compartment, said compartment being isolated relative to said outside environment and said compartment comprising a communication orifice defined by a first connector, said connecting member comprising:
   a main body arranged to cooperate with said communication orifice of said isolated compartment, said main body comprising a second connector complementary to said first connector of said communication orifice so as to form a tight connection between said first connector and said second connector, said main body further being crossed through by a tubing comprising a first end on the side of said outside environment and a second end on the side of said inside environment, wherein:
      said second end of said tubing is located beyond said main body on the side of said inside environment,
      said tubing receives a supply line whereof a first end situated inside said tubing and located beyond said main body on the side of said inside environment is connected to a coupling member provided with an inner channel in such a way that a fluid leaving said supply line through said first end of said supply line flows inside said inner channel,
      said coupling member comprises a first end arranged to provide a tight connection with said first end of said supply line,
      said coupling member is arranged to be tightly connected to said tubing,
      said coupling member has a second end forming a male or female tip for a connection, and
      said supply line has a line part extending past said first end of said tubing and being arranged to be connected to a fluid container and/or a pump and/or a metering system and/or a filtration system.

2. The connecting member according to claim 1, wherein the second end of the coupling member is situated outside said tubing.

3. The connecting member according to claim 1, wherein said coupling member comprises, in sequence, a male tip, a collar and an end part inserted into said supply line, said collar abutting on said second end of said tubing.

4. The connecting member according to claim 1, wherein the connecting member is intended for a single-use.

5. The connecting member according to claim 1, wherein the inner diameter of said tubing is comprised between 3 and 250 mm.

6. The connecting member according to claim 5, wherein the inner diameter of said tubing is comprised between 7 mm and 50 mm.

7. An assembly or a kit comprising:
   a connecting member according to claim 1, and
   a container for a fluid and/or a pump and/or a metering system and/or a filtration system arranged to be connected to a line part of a feed line of said connecting member.

8. An assembly or a kit comprising:
   a coupling part comprising a male or female tip arranged to cooperate with a male or female tip of a coupling member of a connecting member according to claim 1, so as to form a tight quick connection, and
   a supply line arranged to connect, by said coupling part, said coupling member and a device for the aseptic distribution of a fluid and/or a filtration system and/or a metering system.

9. A connecting system for connecting an inside environment of a compartment and an environment outside said compartment, said connecting system comprising:
   a connecting wall having a communication orifice, and
   a connecting member according to claim 1.

10. The connecting system according to claim 9, further comprising:
   a cartridge mounted removably on the main body of said connecting member and which, once mounted on said main body of said connecting member, is secured to said main body so as to form an enclosure that isolates said second end of the tubing, associated or not associated with a coupling member, from said outside environment, and
   a removable closing device inside said compartment arranged to seal said communication orifice of said compartment, arranged to be able to be removed from the inside of said compartment and arranged to be able to be coupled separately with said cartridge when said main body of said connecting member cooperates with said communication orifice of said compartment so as to form a tight connection between said first connecting means and said second connecting means, said removable closing device further being arranged such that, when it is removed from the inside of said compartment, it allows a simultaneous removal of said cartridge by separating it from said main body of said connecting member.

11. The connecting system according to claim 10, wherein said removable closing device inside said compartment comprises fixing means arranged to cooperate with corresponding fixing means of said cartridge so as to mount said removable closing device on said cartridge, tightly and removably.

12. The connecting system according to claim 10, wherein said cartridge has compressible surfaces that are able to couple with corresponding compressible surfaces of said removable closing device.

13. The connecting member according to claim 1, wherein the supply line is made from a flexible material.

14. The connecting member according to claim 1, wherein the inner channel of the coupling member has a diameter smaller than or equal to the internal diameter of a first extremity of the supply line.

15. The connecting member according to claim 1, further comprising a cartridge mounted removably on the main body of said connecting member and which, once mounted on said main body, is secured to said main body so as to form an enclosure that isolates said second end of said tubing, associated or not associated with a coupling member, from said outside environment.

16. A connecting member between an inside environment of a compartment and an environment outside said compartment, said compartment being isolated relative to said outside environment and said compartment comprising a communication orifice defined by a first connector, said connecting member comprising:
   a main body arranged to cooperate with said communication orifice of said isolated compartment, said main body comprising a second connector complementary to said first connector of said communication orifice so as to form a tight connection between said first connector and said second connector, said main body further being crossed through by a tubing comprising a first end on the side of said outside environment and a second end on the side of said inside environment, wherein:
   said second end of said tubing is located beyond said main body on the side of said inside environment,
   said tubing receives a supply line whereof a first end situated inside said tubing and located beyond said main body on the side of said inside environment is connected to a coupling member provided with an inner channel,
   said coupling member comprises a first end arranged to provide a tight connection with said first end of said supply line,
   said coupling member is arranged to be tightly connected to said tubing,
   said coupling member has a second end forming a male or female tip for a connection,
   said supply line has a line part extending past said first end of said tubing and being arranged to be connected to one of a fluid container, a pump, a metering system, or a filtration system, and
   wherein the inner channel of the coupling member has a diameter smaller than or equal to the internal diameter of a first extremity of said supply line.

17. A connecting member between an inside environment of a compartment and an environment outside said compartment, said compartment being isolated relative to said outside environment and said compartment comprising a communication orifice defined by a first connector, said connecting member comprising:
   a main body arranged to cooperate with said communication orifice of said isolated compartment, said main body comprising a second connector complementary to said first connector of said communication orifice so as to form a tight connection between said first connector and said second connector, said main body further being crossed through by a tubing comprising a first end on the side of said outside environment and a second end on the side of said inside environment, said second end of said tubing being located beyond said main body on the side of said inside environment; and
   a cartridge mounted removably on the main body of said connecting member and which, once mounted on said main body, is secured to said main body so as to form an enclosure that isolates said second end of said tubing, associated or not associated with a coupling member, from said outside environment, wherein:
   said tubing receives a supply line whereof a first end situated inside said tubing and located beyond said main body on the side of said inside environment is connected to a coupling member provided with an inner channel,
   said coupling member comprises a first end arranged to provide a tight connection with said first end of said supply line,
   said coupling member is arranged to be tightly connected to said tubing,
   said coupling member has a second end forming a male or female tip for a connection,
   said supply line has a line part extending past said first end of said tubing and being arranged to be connected to one of a fluid container, a pump, a metering system, or a filtration system.

18. The connecting member according to claim 17, wherein said cartridge comprises an open end and a closed end, said open end comprising fixing means arranged to cooperate with corresponding fixing means of said main body of said connecting member so as to tightly and removably mount said cartridge on said main body.

19. The connecting member according to claim 17, wherein said cartridge has a tight surface for coupling with a corresponding tight surface of said main body of said connecting member.

* * * * *